(12) United States Patent
Killoran et al.

(10) Patent No.: US 10,144,164 B2
(45) Date of Patent: *Dec. 4, 2018

(54) DIE INSERT FOR MOLDING A SPEAKER GRILLE AND METHOD OF FORMING SAME

(71) Applicant: HI-TECH MOLD & ENGINEERING, INC., Rochester Hills, MI (US)

(72) Inventors: Steve Killoran, Roseville, MI (US); Anthony Debenedictis, Troy, MI (US); David Geschke, Rochester Hills, MI (US); Kevin Taverner, Shelby Township, MI (US)

(73) Assignee: HI-TECH MOLD & ENGINEERING, INC., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,832

(22) Filed: May 7, 2018

(65) Prior Publication Data

US 2018/0250860 A1 Sep. 6, 2018

Related U.S. Application Data

(63) Continuation-in-part of application No. 15/488,928, filed on Apr. 17, 2017.
(Continued)

(51) Int. Cl.
*B29C 45/34* (2006.01)
*B29C 45/73* (2006.01)
(Continued)

(52) U.S. Cl.
CPC .......... *B29C 45/34* (2013.01); *B29C 45/7312* (2013.01); *B29K 2023/12* (2013.01);
(Continued)

(58) Field of Classification Search
CPC .............................. B29C 45/34; B29C 45/345
See application file for complete search history.

(56) References Cited

U.S. PATENT DOCUMENTS 3,443,281 A * 5/1969 Walby .................. B29C 33/302
249/117
3,555,620 A 1/1971 Bucy
(Continued)

FOREIGN PATENT DOCUMENTS

WO 2015063321 A1 5/2017

OTHER PUBLICATIONS

International Search Report and Written Opinion issued in international application PCT/US 2017/027899 (Publication No. WO 2017/0181170) dated Jun. 29, 2017.

*Primary Examiner* — Jill L Heitbrink
(74) *Attorney, Agent, or Firm* — Warner Norcross + Judd LLP

(57) ABSTRACT

An insert of a die for molding a speaker grille includes a forming portion. The forming portion defines a forming surface, from which a plurality of pins extend for forming apertures in a speaker grille. The forming surface defines a plurality of apertures disposed at spaced locations between the pins. The apertures are interconnected with a plurality of vent channels interconnecting the apertures with the vent channels for venting air disposed in a die when melted polymer used to form the speaker grille is injected into a die cavity defined by the die. The forming member and the vent channels are formed as a monolithic construction.

15 Claims, 8 Drawing Sheets

Related U.S. Application Data

(60) Provisional application No. 62/323,130, filed on Apr. 15, 2016.

(51) Int. Cl.
*B29L 31/34* (2006.01)
*B29K 23/00* (2006.01)
*B29L 31/30* (2006.01)

(52) U.S. Cl.
CPC ....... *B29K 2905/00* (2013.01); *B29L 2031/30* (2013.01); *B29L 2031/3418* (2013.01)

(56) References Cited

U.S. PATENT DOCUMENTS

| | | | |
|---|---|---|---|
| 3,811,647 A * | 5/1974 | Pink | .................. B29C 33/10 249/160 |
| 5,226,021 A | 11/1993 | Jacobson | |
| 5,356,281 A | 10/1994 | Katsuno et al. | |
| 5,419,865 A * | 5/1995 | Ogata | ................ B29C 45/2628 249/64 |
| 5,665,281 A | 9/1997 | Drummond | |
| 5,690,886 A * | 11/1997 | Kurihara | ............. B29C 45/0046 264/328.1 |
| 6,164,953 A | 12/2000 | Winget | |
| 6,533,880 B1 | 3/2003 | Van Manen | |
| 2002/0150274 A1 | 10/2002 | Winget | |
| 2005/0257998 A1 | 11/2005 | Sato et al. | |
| 2006/0134250 A1 | 6/2006 | Henrotte | |
| 2007/0145637 A1 | 6/2007 | Sato et al. | |
| 2011/0163509 A1 | 7/2011 | Pham et al. | |
| 2014/0014286 A1 | 1/2014 | Suzuki et al. | |
| 2016/0228942 A1 | 8/2016 | Maegawa et al. | |
| 2017/0303021 A1 * | 10/2017 | Killoran | ................. H04R 1/023 |

\* cited by examiner

DIE INSERT FOR MOLDING A SPEAKER GRILLE AND METHOD OF FORMING SAME

PRIOR APPLICATIONS

The present application is a continuation-in-part patent application of U.S. patent application Ser. No. 15/488,928 filed Apr. 17, 2017, which claims the benefit of U.S. Provisional Patent Application No. 62/323,130 filed on Apr. 15, 2016. The entire disclosures of each of the above applications are incorporated herein by reference.

TECHNICAL FIELD

The present invention relates generally toward an insert of a die for molding a speaker grille and a method for forming a speaker grille. More specifically, the general invention relates toward an improved configuration and substrate of an insert of a die for molding speaker grille providing improved cycle times.

BACKGROUND

For many years, speaker grilles for use in automobiles have been integrated into, for example, door pads, package shelves, and other interior components of an automobile. Integrating speaker grilles into these components by way of a simple injection mold reduces complexity of assembling a door pad or package shelf. Various options, including differently configured speaker grilles, are available to meet the desires of an individual consumer. As such, a number of different inserts are adapted to mold a speaker grille simultaneously with that of a door pad substrate or other component. A die insert for forming a speaker grille typically includes a plurality of pins used to form a plurality of small acoustic openings in the speaker grille. The die insert is installed in a larger die used to form the substrate of a door pad or other component simultaneously with the speaker grille.

The level of complexity of the pin configuration used to form the acoustic openings in the speaker grille has prevented normal venting features from being included in a typical speaker grille insert as these features are with less complex dies and die inserts. In some instance, use of complex valves has been attempted, but has proven costly and prone to break. Therefore, inserts for speaker grilles have been manufactured from Porcerex® II, a porous substrate that allows air to pass through, but prevents liquefied polymer from passing through, while retaining the polymer used to form the speaker grille inside the die cavity. Porcerex® II is exceedingly expensive and difficult to form. In addition, venting characteristics the porous substrate have not proven effective to maintain desired cycle time for molding a speaker grille due to the slow diffusion of gasses through the substrate. Therefore, it would be desirable to develop a new insert for forming a speaker grille that overcomes the deficiencies known to the present porous insert.

SUMMARY

An insert for a die for building a speaker grille includes a forming portion including a forming surface defining a plurality of pins. The pins form acoustic openings in the speaker grille necessary for allowing sound generated from a speaker to pass into a passenger compartment. The forming surface defines a plurality of apertures disposed at spaced locations between the pins for venting gas from a die cavity while forming the speaker grille. The apertures are interconnected with a plurality of vent channels extending through the forming member venting the gas disposed in the die cavity when melted polymer is injected into the die to form the speaker grille. The forming portion and the vent channels are defined by a monolithic construction. The vent channels are each interconnected to a central vent providing for equalized air pressure between the vent channels and the central vent at about atmospheric air pressure, even while molding.

The monolithic construction of the present forming portion for molding a speaker grille is achieved through three dimensional printing techniques so that the monolithic construction of the complex portions of insert is achieved. The monolithic construction overcomes the deficiencies known to other venting techniques used to form speaker grilles that are complex and prone to break. In addition, the gas venting rates established by this technique exceeds the venting rate of a porous substrate, which reduces cycle time necessary to adequately form a speaker grille. A further enhancement is to form a base portion using conventional forming techniques while interconnecting more complex forming portion that is printed.

In addition, quality improvements are achieved by the invention of the present application. For example, additional venting can now be provided to localized areas of the die insert where gas is believed to prevent liquid polymer flow at no additional cost. Localized increase of gas venting is not possible when using a homogeneous porous substrate to form the die substrate. This improved venting provides for more rapid forming methods while simultaneously improving quality of the speaker grille being formed by avoiding voids in the molded product. The invention of the present application solves both known quality problems by providing localized gas venting, and reduces cost of manufacturing speaker grilles by providing a simplified low cost die insert.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION

Figure 1:
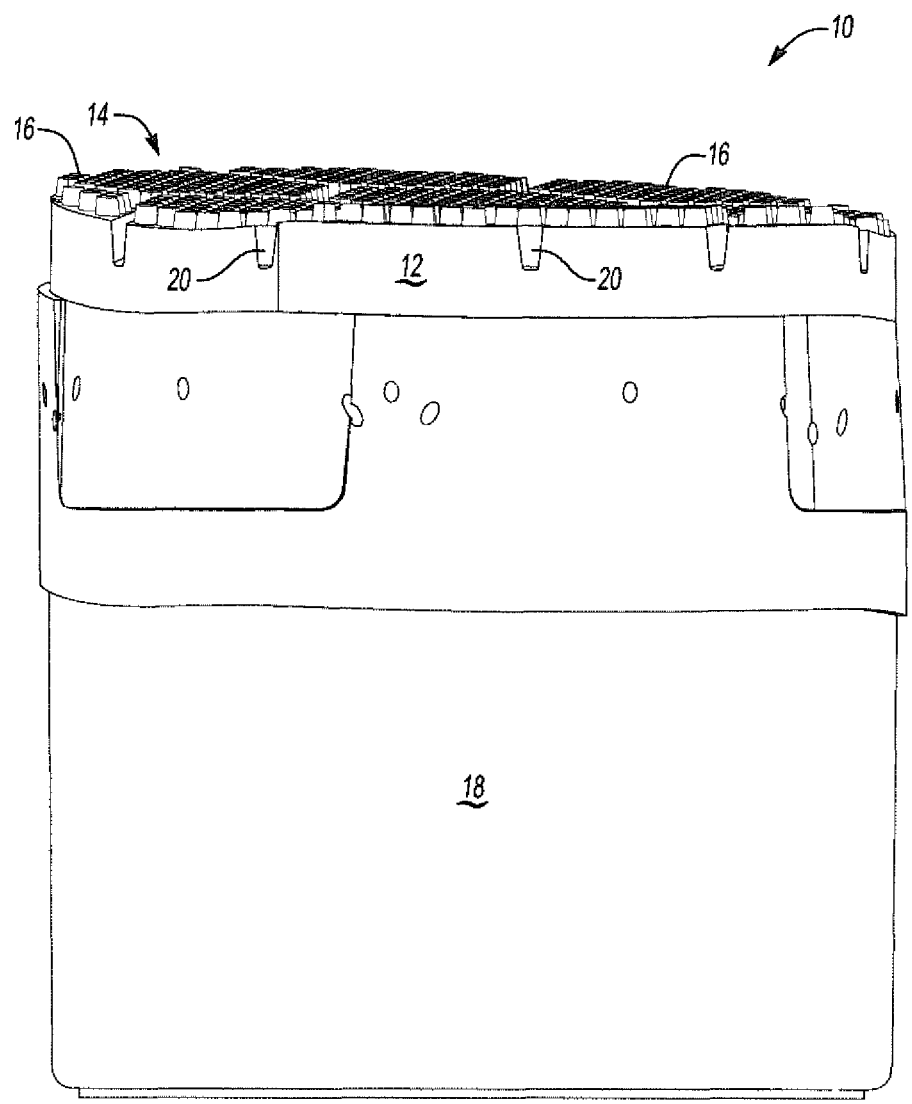
FIG. 1 shows a side view of a die insert for forming a speaker grille.

Referring to FIG. 1, a die insert of the present invention for forming a speaker grille (not shown) is generally shown at 10. The die insert 10 includes a forming member 12 that defines a forming surface 14. The forming surface 14 defines a plurality of pins 16 used to form acoustic openings in the speaker grille. The die insert 10 fits within a complementary opening defined by a first die member 15 (FIG. 7) used to form door pads, package shelfs, and other components of a vehicle in which it is desirable to form a speaker grille. It should be understood by those of ordinary skill in the art that a speaker grille is injection molded simultaneously with injection molding a vehicle component to provide efficiency and eliminate the need to form a separate speaker grille that is later mounted upon the vehicle component. An integrated speaker grille significantly reduces labor and cost associated with attaching a separate speaker grille to a vehicle component.

In one embodiment, the die insert 10 is defined by a monolithic construction, without moving parts. The die insert 10 is encased is defined as solid structure including an insert wall 18. The material used to form the structure is substantially impermeable to gasses and polymers used to simultaneously form the speaker grille and vehicle component.

Figure 2:
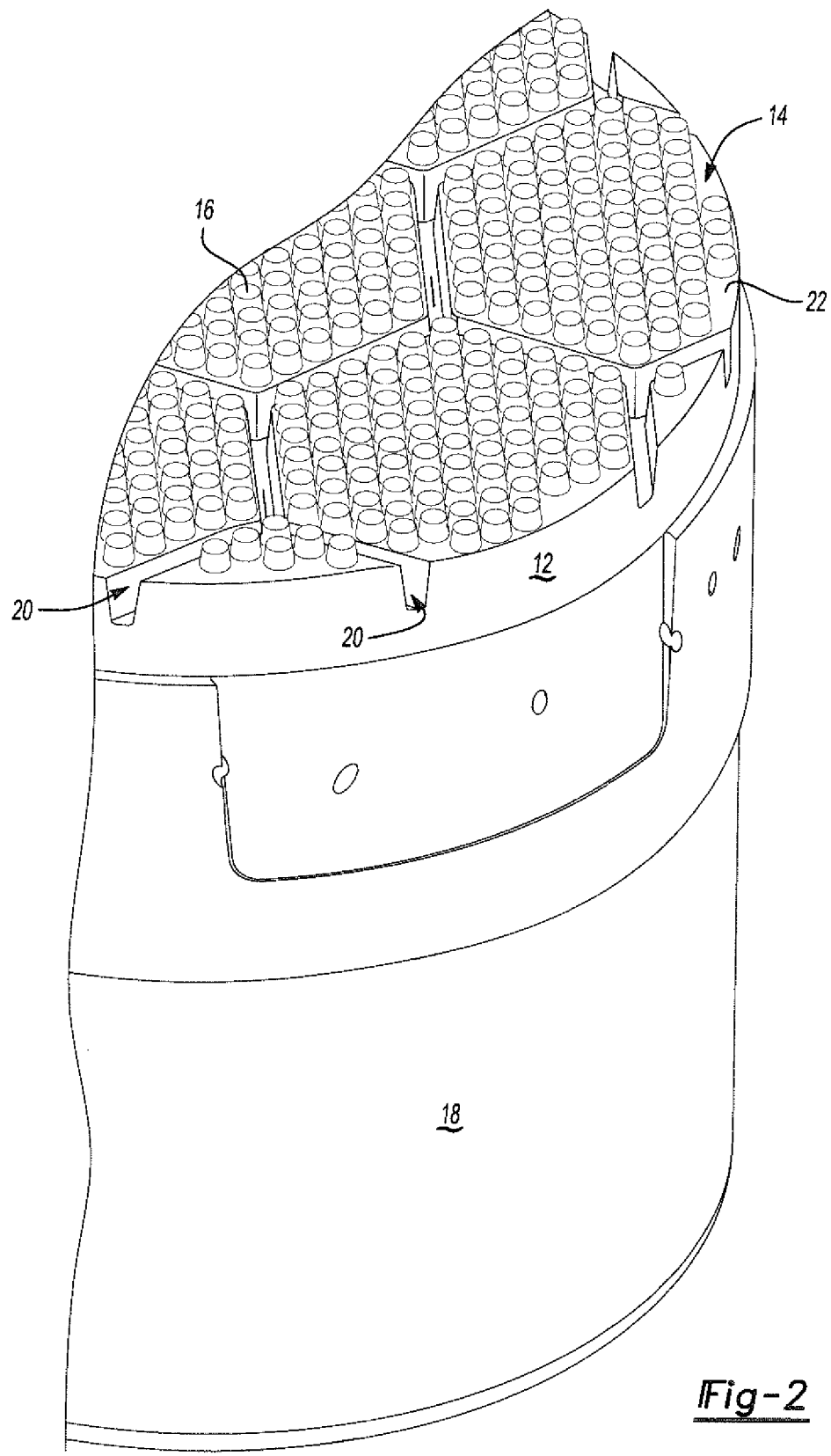
FIG. 2 shows a partial perspective view of the die insert.

Referring now to FIG. 2, the pins 16 are spaced in a predetermined pattern such that an aesthetically pleasing grille is formed integrally with the vehicle pad as will be explained further below with respect to FIG. 7. The pins 16 are formed from a three dimensional printing process achieving a configuration that is near to dimensional intent. If necessary, electrical discharge machining or an equivalent machining process is performed on the pins 16 to achieve net dimensional intent.

Channels 20 are defined in the forming surface 14 to provide structural support to the molded speaker grille, and further provide an aesthetically pleasing appearance for the speaker grille. The pins 16 extend between the channels 20 from a generally planer pin base 22 also defined by the forming surface 14. In an alternative embodiment, the pin base 22 includes contours to meet functional design criteria or provide a different appearance.

Figure 3:
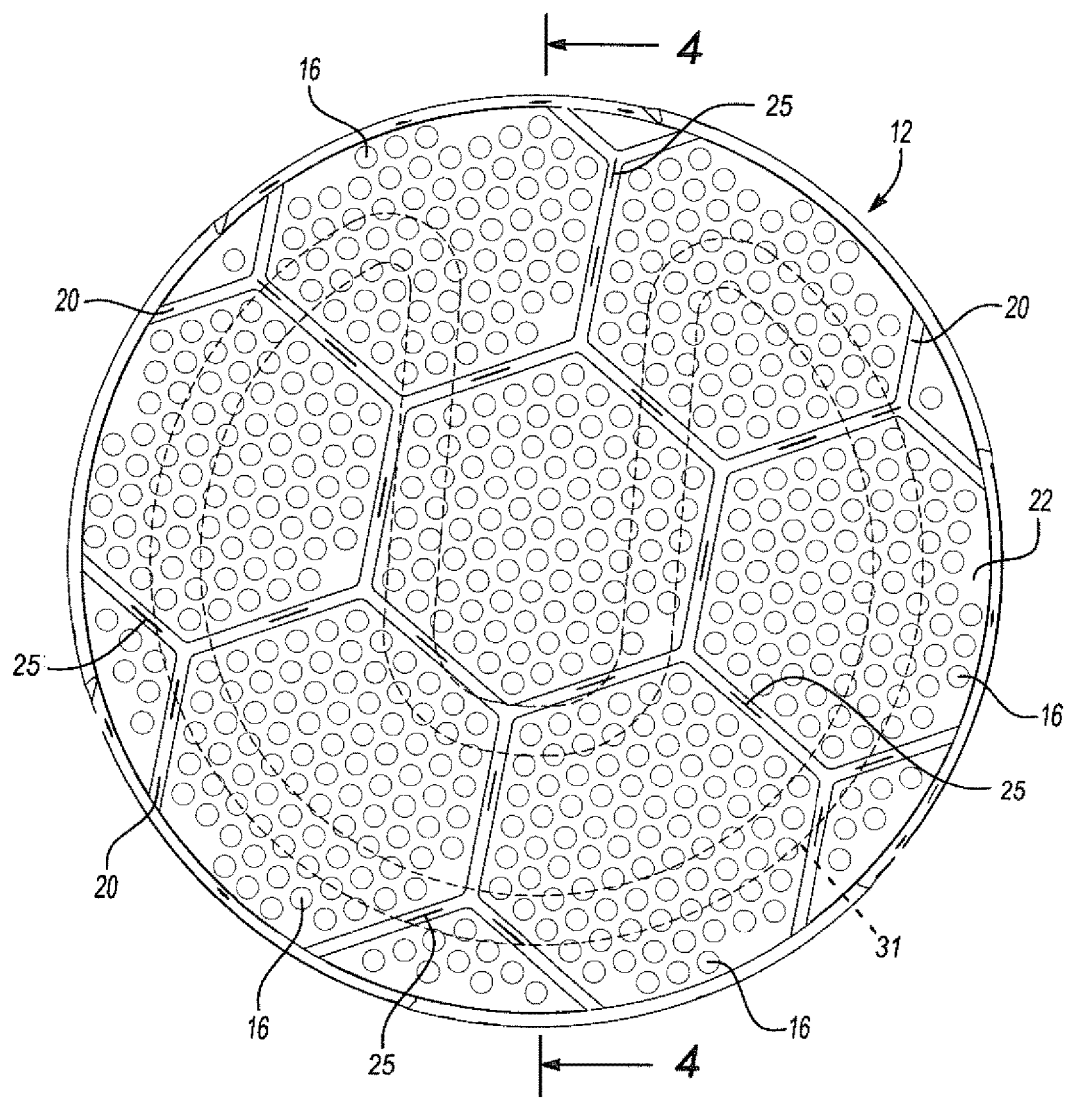
FIG. 3 shows a plan view of the forming surface of the die insert.
Figure 4:
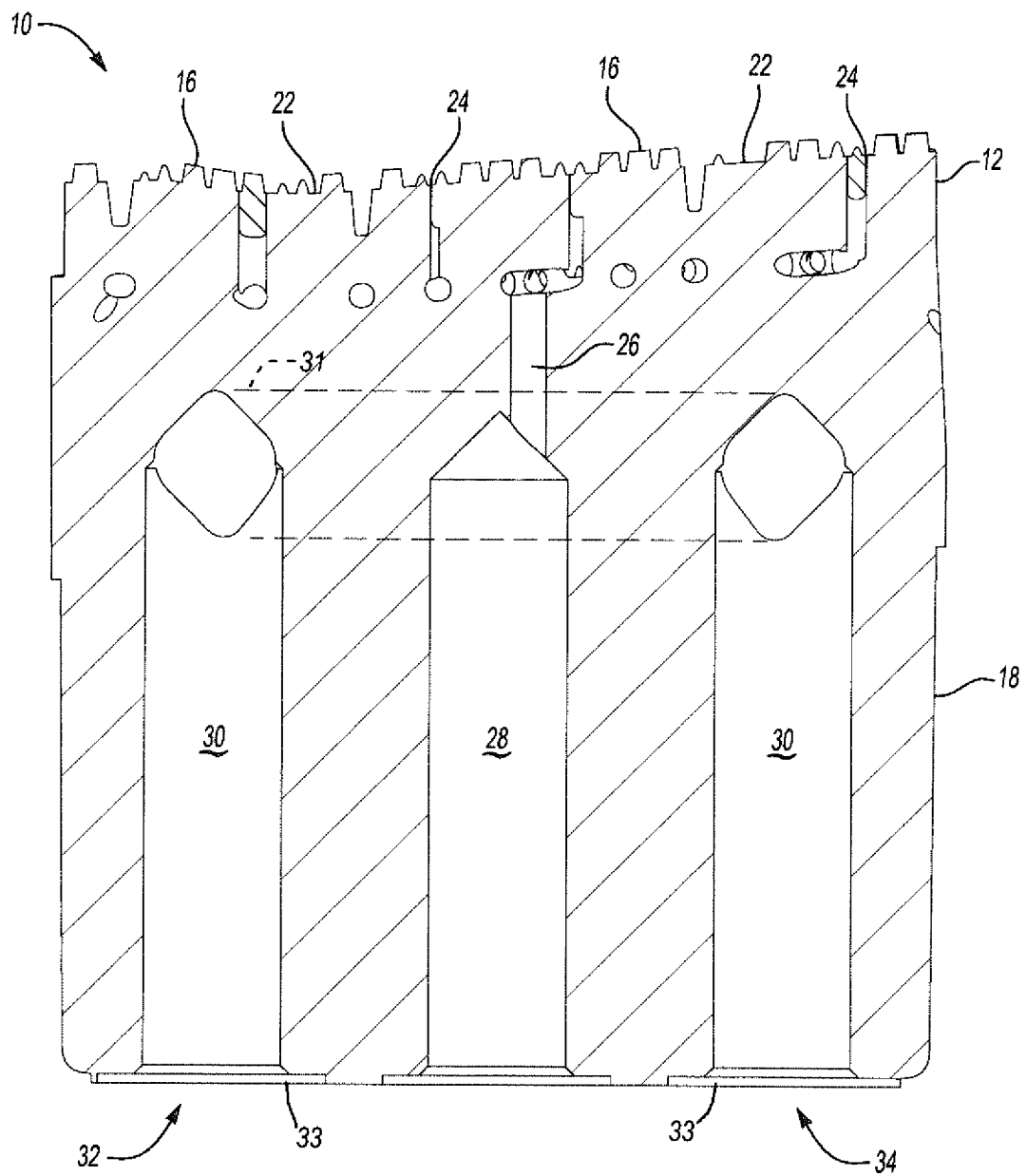
FIG. 4 shows a cross-sectional view of the die insert through line 4-4 of FIG. 3.
Figure 5:
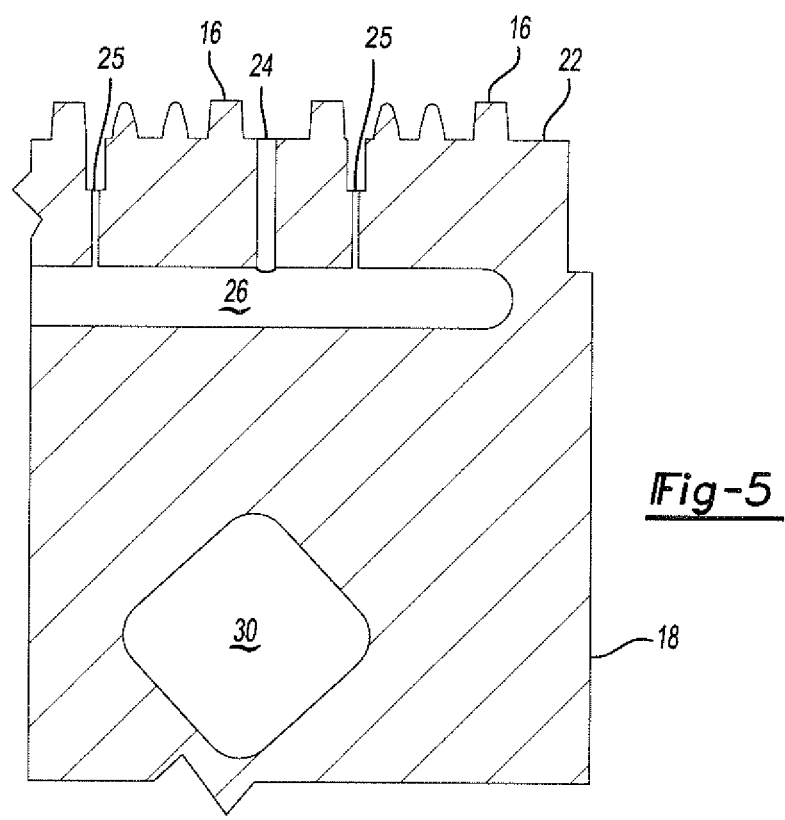
FIG. 5 shows a further sectional view of the die insert.
Figure 6:
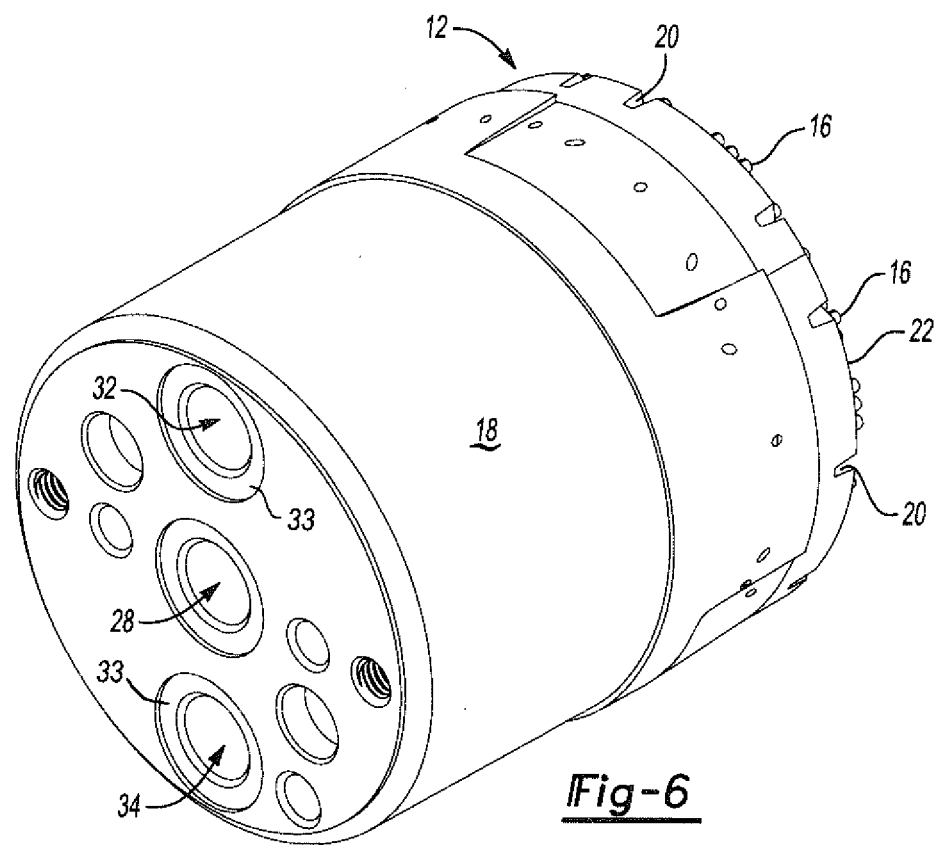
FIG. 6 shows a bottom, prospective view of the die insert.

Referring to FIG. 4, a cross-sectional view of the die insert 10 of the present invention is shown along line 4-4 of FIG. 3. A plurality of pin apertures 24 are defined by the pin base 22 between predetermined pins 16. In addition, a plurality of channel apertures 25 are also located at a floor of the channels 20 providing further venting enabling the polymer to properly fill the channels 20. The apertures 24, 25 are sized to allow air or other gases to exit a die cavity 27 (FIG. 7) during the component molding process while retaining liquefied polymer as will be explained further herein below. As such, efficient flow of the polymer between the pins 16 and through the channels 20 is achieved.

The apertures 24, 25 are interconnected to one or more a vent channels 26. Each vent channel 26 leads to a central vent 28 that vents gases received through the apertures 24, 25 to the atmosphere. As set forth above, the pins 16 are formed by way of three dimensional printing techniques. It should be understood that the entire insert 10 may be formed from by the three dimensional printing techniques. Forming the insert in this manner allows for the apertures 24, 25 the vent channel 26, and the vent 28 and all of the other elements of the insert 10 to be formed within a solid structure. Alternatively, more basic portions of the insert 10 may be formed through conventional cast techniques and combined with the printed portions that are more complex to improve manufacturing efficiency as will be explained further herein below. Therefore, the entire insert 10 includes a monolithic construction without requiring additional machining for venting and without requiring multiple components being assembled to achieve necessary venting.

A cooling channel 30 is also formed in the insert 10 and includes a cooling inlet 32 and a cooling outlet 34. The cooling channel 30 provides for the flow of a cooling medium throughout the die insert 10 to increase the rate at which the liquefied polymer solidifies. The cooling channel 30 circumscribes the vent 28 at a location proximate the forming member 12. In a similar manner as the vent channel 26, the cooling channel 30 was formed within the die insert 10 without requiring machining or additional components. Further, coolant supply lines (not shown) are optionally affixed to the insert 10 at the coolant inlet 32 and the coolant outlet 34 through a printed and machined connector 33 without requiring additional coupling arrangements. Cooling the die insert 10 formed with a monolithic construction is not possible when the insert 10 is formed from a porous substrate. However, forming the die insert 10 of the present invention with a non-porous substrate with strategically placed venting provides the ability to cool the insert 10 without requiring complicated, and expensive external cooling features.

Figure 7:
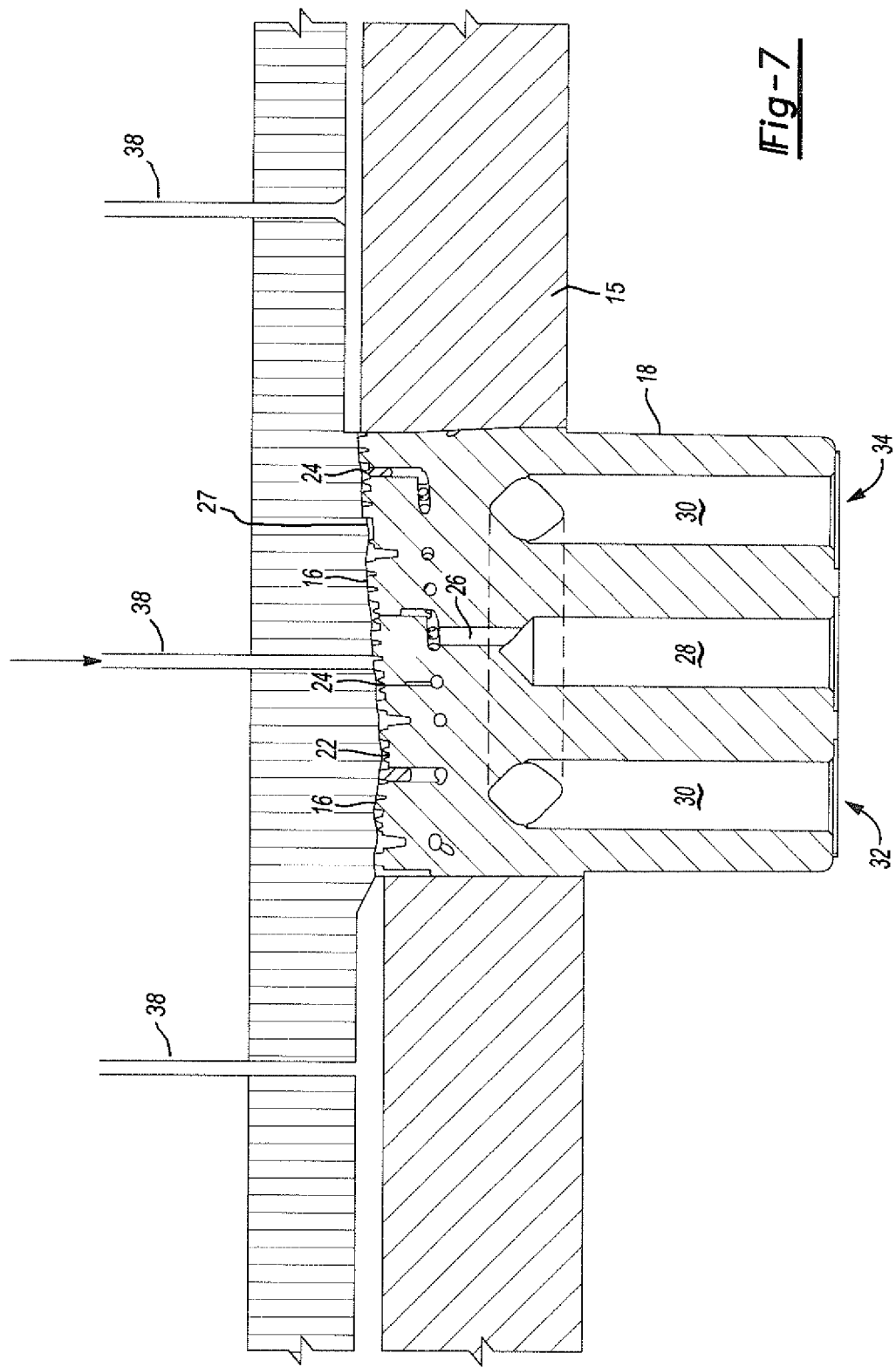
FIG. 7 shows a partial cross-sectional view of the die insert installed in an injection mold assembly.

Referring now to FIG. 7, the insert 10 is shown installed in an injection mold assembly generally shown at 36. The assembly 10 defines the die cavity 27 between the first die member 15 and a second die member 17. For clarity, only a cut away of the injection mold assembly 36 is shown. However, it should be understood that the assembly 36 is used to form an entire vehicle component simultaneously with the speaker grille as is set forth above.

The assembly includes a plurality of runners 38 that are each interconnected with an extruder (not shown) for delivering liquefied polymer such as, for example, polypropylene, filled polypropylene or and equivalent to the die cavity 27. The runners are spaced along one or both of the first die member 15 and the second die member 17 for efficient polymer flow into the die cavity 27. In addition, the apertures 24, 25 are space at locations in the insert 10 that most efficiently facilitates polymer flow through the die cavity 27 into the area of the forming surface 14. In addition, clusters, or higher density of apertures 24, 25 may be located in the forming surface 14 to provide additional venting where necessary to prevent empty spaces forming in the speaker grille resulting from gas pockets in the die cavity 27.

Figure 8:
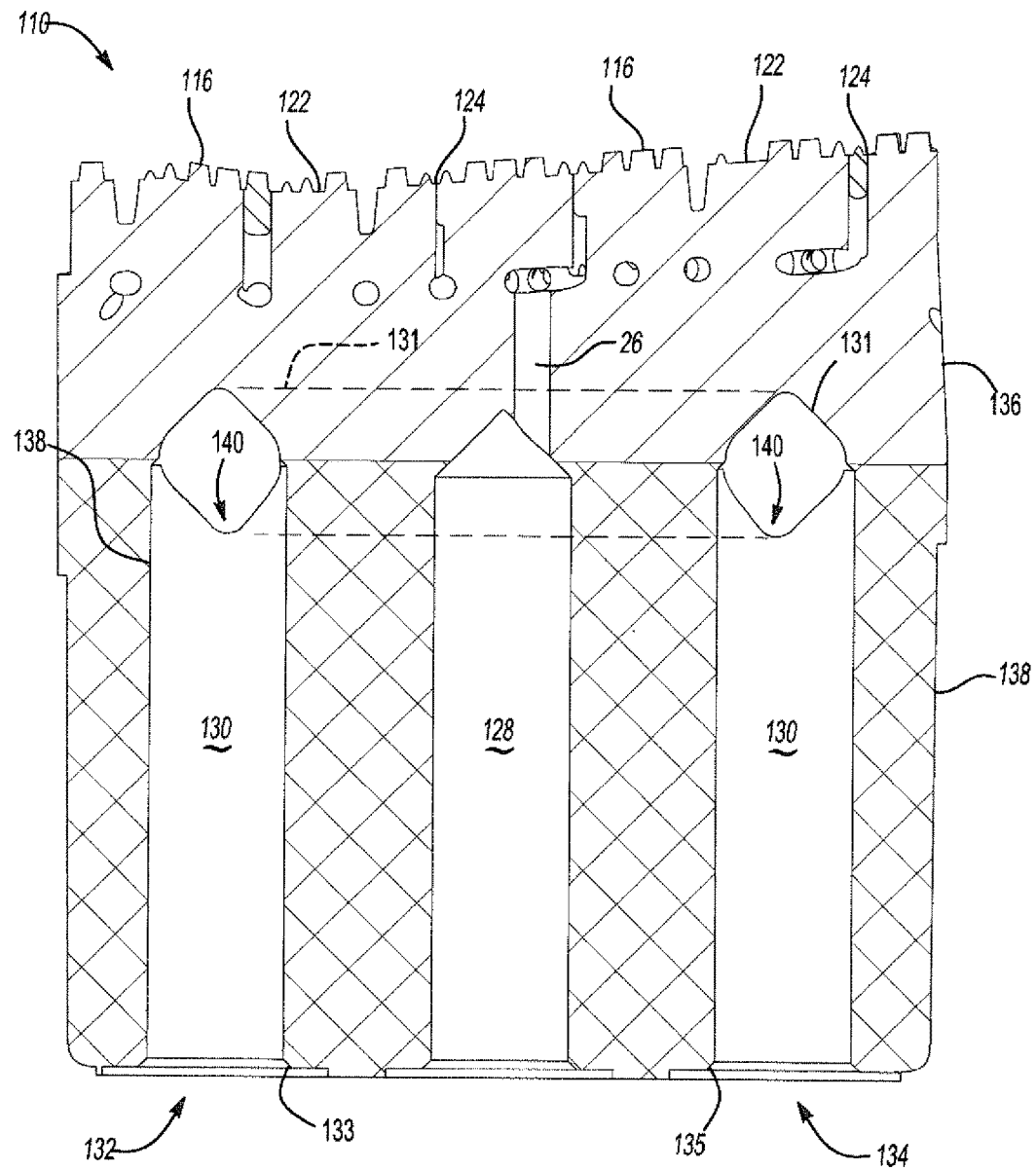
FIG. 8 shows a cross-sectional view of a further embodiment of the die insert.
Figure 9:
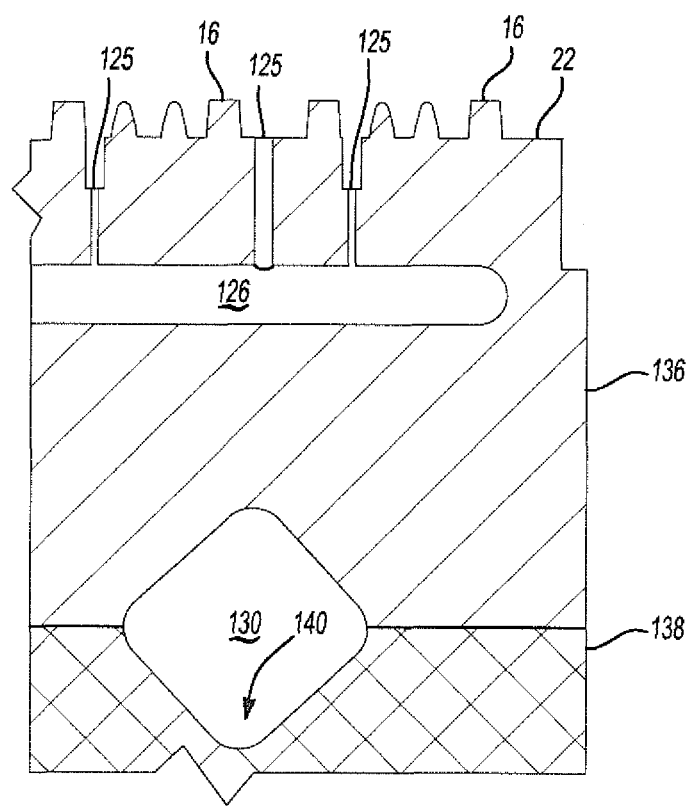
FIG. 9 shows a further sectional view of the further embodiment of the die insert.

An alternative embodiment is generally shown at 110 in FIGS. 8 and 9 wherein like elements to the prior embodiment include like element numbers, but in the one hundred series. The alternate embodiment 110 includes a base portion 135 onto which a molding portion 136 is printed. The base portion 135 is cast or otherwise formed in a conventional manner to reduce the amount of time to manufacture the die insert 110. Therefore, the complex venting configuration used to vent the die cavity 27 (FIG. 7) is printed while the base portion 135 that does not require complex venting is formed using conventional methods.

Cooling channels 130 and a vent 128 are formed while casting the base portion 138 in a conventional manner. Dimensional accuracy, if required, is achieved by machining the cooling channels 130 and the vent 128. As such, connectors 133, 135 for coolant inlet 132 and the cooling outlet 134 are also machined for dimensional accuracy.

The base portion 138 presents a mating face onto which the molding portion 136 is printed or otherwise connected. A groove 140 is defined in the mating face to form a lower portion of the cooling circulation channel 131. An upper portion of the cooling circulation channel is formed while printing the forming portion 136 of the alternate die insert 110. In a similar manner, the printed vent channel 126 is printed to interconnect with the cast vent 128. In this manner, no machining or other reconfiguration of the functional content of the base portion 138 is required.

It should be understood that the complex portions of the die insert 110 are formed by printing techniques and the more basic portions if the die insert 110 are formed from conventional techniques. Therefore, a plurality of pins 116 extend from a forming surface 122 that also defines pin apertures 116 for evacuating gasses from the die cavity 27 (FIG. 7) while liquefied polymer fills the die cavity 27. Complex vent channels 126 interconnect the pin apertures 116 with the central vent 128 that equalizes the pressure in the vent channels and the central vent at about atmospheric pressure. In addition, groove apertures 124 extending from the forming surface 122 within the groove 120 also interconnect with the vent channels 126 in a similar manner to vent gasses collecting in the groove 120.

The invention has been described herein in an illustrative manner, and it is to be understood that the terminology which has been used is intended to be in the nature of words of description rather than of limitation. Obviously, many modifications and variations of the invention are possible in light of the above teachings. The invention can be practiced otherwise than as specifically described within the scope of the appendant claims.

What is claimed is:

1. An insert of a die for molding a speaker grille, said insert comprising:
   a forming portion including a forming surface defining a plurality of pins extending therefrom for forming acoustic openings in a speaker grille, said forming surface defining a plurality of apertures disposed at spaced locations between said pins;
   said apertures being interconnected by a plurality vent channels extending through said forming member for venting gas disposed in a die cavity of the die when melted polymer used to form the speaker grille is injected into the die cavity;
   a base portion defining a mating face having said forming portion adhered thereto; and
   said forming portion and said vent channels being defined by a monolithic construction.

2. The insert set forth in claim 1, wherein said plurality of vent channels is interconnected with a vent manifold.

3. The insert set forth in claim 1, wherein said vent manifold is defined by said forming portion.

4. The insert set forth in claim 2, wherein said vent manifold is interconnect to a central vent.

5. The insert set forth in claim 4, wherein said central vent is defined by said base portion.

6. The insert set forth in claim 4, wherein said central vent releases air evacuated from the die to atmosphere.

7. The insert set forth in claim 1, further including a cooling circuit for circulating a cooling medium proximate said forming portion.

8. The insert set forth in claim 7, wherein said cooling circuit is defined by a groove disposed in said base portion and said forming portion.

9. The insert set forth in claim 1, wherein said forming portion is formed from a homogeneous alloy.

10. The insert set forth in claim 1, wherein said homogeneous alloy is substantially impermeable.

11. The insert set forth in claim 1, wherein said forming portion and said base portion are formed from an impermeable alloy.

12. A method of forming a speaker grille, comprising the steps of:
   providing a die insert forming portion including a forming surface defining a plurality of pins extending therefrom for forming acoustic openings in a speaker grille, said forming surface defining a plurality of apertures disposed at spaced locations between said pins;
   interconnecting said apertures by a plurality vent channels extending through said forming member for venting gas disposed in a die cavity of the die when liquefied polymer used to form the speaker grille is injected into the die cavity;
   injecting liquefied polymer through a plurality of runners into a die cavity; and
   venting gas through said apertures disposed between said pins into said vent channels thereby allowing the liquefied polymer to fill the die cavity.

13. The method set forth in claim 12, wherein said step of providing a forming portion of said die insert is further defined by providing a forming portion formed from an impermeable alloy.

14. The method set forth in claim 12, further including the step of interconnecting said plurality of vent channels to a central vent being at least partially formed in said forming portion and venting air through said plurality of vent channels into said central vent when injecting liquefied polymer into said die cavity.

15. The method set forth in claim 12, further including the step of equalizing air pressure in said die cavity with atmospheric pressure through said vent channels and said central vent.

\* \* \* \* \*